UNITED STATES PATENT OFFICE.

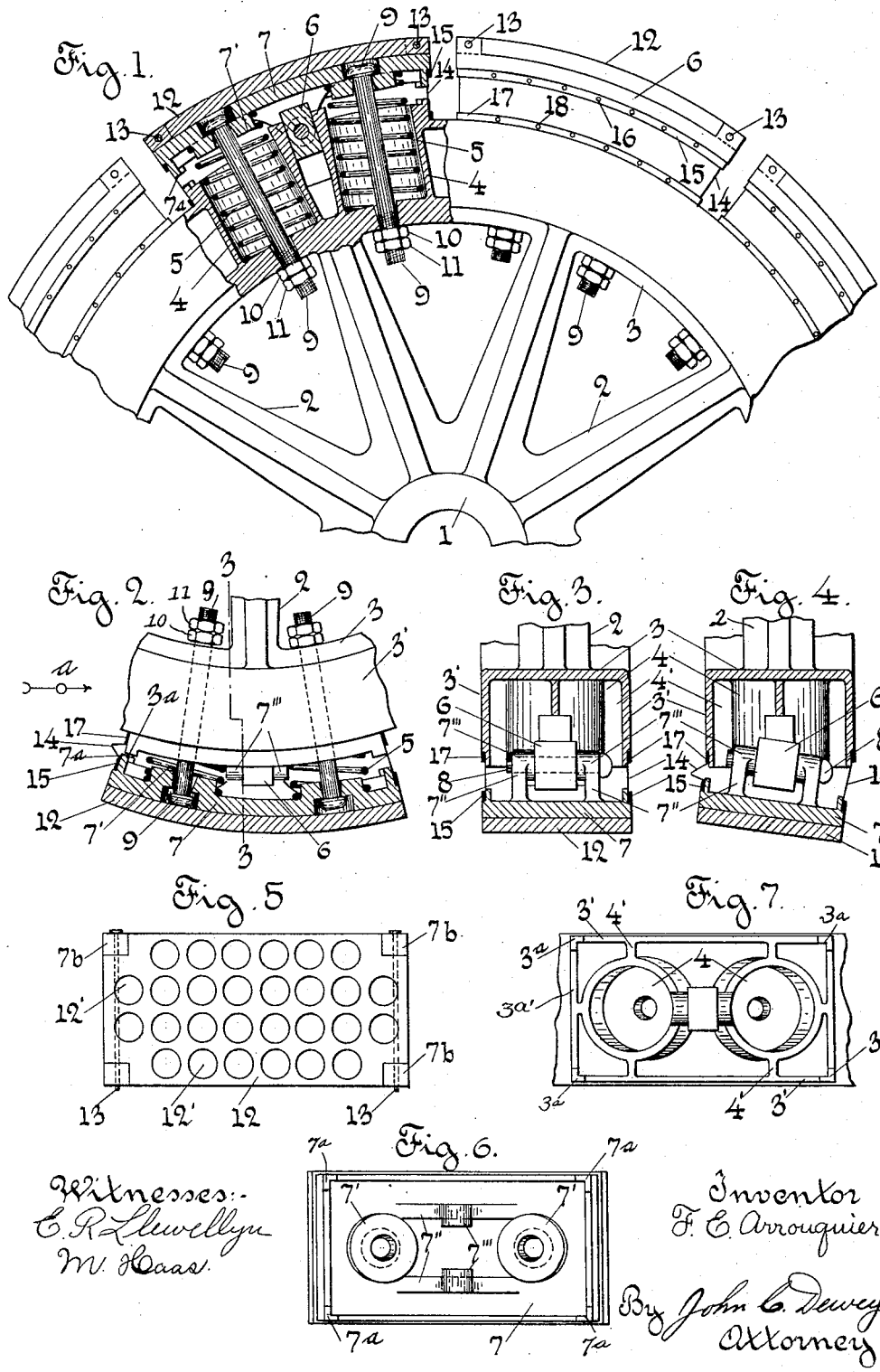

FREDERICK E. ARROUQUIER, OF WORCESTER, MASSACHUSETTS.

RESILIENT TIRE.

1,189,903.　　　　Specification of Letters Patent.　　Patented July 4, 1916.

Application filed January 8, 1915. Serial No. 1,120.

*To all whom it may concern:*

Be it known that I, FREDERICK E. ARROUQUIER, a citizen of the United States, residing at Worcester, in the county of Worcester and State of Massachusetts, have invented certain new and useful Improvements in Resilient Tires, of which the following is a specification.

My invention relates to resilient tires, to be used on automobile trucks, and other heavy vehicles, and to that class of tires which have a series of separate tread members, adapted to move independently of each other, said members preferably having a solid tread.

The object of my invention is to provide an improved resilient tire of the class above referred to.

My invention consists in certain novel features of construction of my improved resilient tire, as will be hereinafter fully described.

Referring to the drawing:—Figure 1 is a side view of a portion of a wheel provided with my improved resilient tire; a portion of said resilient tire is shown in section. Fig. 2 shows one of the tread members, and a part of the rim to which it is attached; the tread member is shown in section, and is moved inwardly at one end. Fig. 3 is a section, on line 3, 3, Fig. 2, looking in the direction of arrow $a$, same figure. Fig. 4 corresponds to Fig. 3, but shows the tread member moved inwardly at one side. Fig. 5 is a plan view of the outer surface or tread of the tread member. Fig. 6 is an inner view of the tread member, detached, and, Fig. 7 is a plan view of a detached portion of the rim of the wheel.

In the accompanying drawing, 1 is the hub portion of a wheel, and 2 the spokes or arms, connecting the hub 1 with the rim 3. The rim 3 has on each edge, and extending around the wheel, a flange 3′, and between the two flanges 3′, and extending outward from and around the rim 3 of the wheel are a series of cylindrical shaped tubular or hollow receptacles 4, which are preferably connected by webs 4′ to the flanges 3′, as shown in Fig. 7. All of the above parts are preferably made of metal, and integral.

Within each receptacle 4 is a helically coiled compression spring 5, which may be of varying size and strength, as desired. The receptacles 4 are arranged in pairs on the rim 3, around the periphery of the wheel, and between each pair of receptacles 4 is a movable block 6, made separate from the other parts.

A plate 7, preferably of metal, forms a tread member, and is preferably of the same width as the rim 3, and extends upon the outer side of each pair of receptacles 4, and is of curved shape in the direction of its length. The member 7 has upon its inner surface two circular projections 7′, which extend within the outer ends of the springs 5, and act to hold the springs in proper position, see Figs. 1 and 2. The member 7 also has two web portions 7″, which have thereon, the hubs or bearings 7‴, between which extends the movable block 6, which is secured to the two web portions 7″, preferably by a bolt 8, which extends through the hub portions 7‴, and a hole in said block 6, see Fig. 3.

Near each end of the member 7, a bolt 9 extends through an opening in said member and in the cylindrical projection 7′ thereon, and through the center of the coil spring 5, and through an opening in the rim 3. The head of the bolt 9 extends within a countersunk opening in the member 7, and preferably below the outer surface of said member, as shown, and the opening through the cylindrical projection 7′ is made tapering, to allow of a side movement of the bolt 9 therein. The inner end of the bolt 9 is threaded, and has thereon two nuts 10, and 11. The bolts 9, and the nuts 10 and 11 thereon, act to secure the member 7 to the rim 3 of the wheel. By turning on or off the nuts 10 and 11, on the threaded end of the bolts 9, the springs 5 may be compressed, or released, as desired.

On the ends of each member 7, on the opposite sides, are preferably formed extensions 7ª, which are adapted to engage extensions 3ª on the side flanges 3′ of the rim 3, to limit the inward movement of the member 7, and prevent the setting of the springs 5. Upon the outer side of the tread member 7 extends a tread block 12, which is preferably made of rubber, leather, or other yielding material, and may have a series of recesses 12′ therein, as shown in Fig. 5. The tread block 12 forms the bearing surface or tread of the wheel, and in this instance is held in place and secured to the tread member 7, by bolts 13, which extend through lugs 7ᵇ on the outer surface and at the corners of the tread member 7, and through the ends of the tread block 12, see Fig. 5.

The flanges 3', on their outer edges, are preferably recessed, and the tread members 7 on their side outer edges are also preferably recessed, and within these recesses, and between the flanges 3' and the edges of the member 7, and extending in the recesses therein, is secured a strip 14 of flexible material, such as leather, or canvas, which material extends around the sides and ends of the member 7, and is secured thereto, in this instance by a strip of metal 15, and rivets 16. The strip 14 is also secured in this instance to the outer edges of the flanges 3', by a strip of metal 17, and rivets 18, and also to transverse ribs 3ᵃ', extending between the side flanges 3', see Fig. 7. The strip 14 being of flexible material, does not interfere with the movement of the tread member 7 and the tread block 12 thereon, and acts to exclude all dirt and other material, and form a protection or covering around the movable or yielding parts or sections of the wheel.

From the above description in connection with the drawing, the operation of my improvements in resilient tires will be readily understood by those skilled in the art.

The resilient tire is made up of a series of separate and independent yielding parts or sections, extending entirely around the periphery of the wheel; these parts are maintained in their outer position, when not in contact with the ground, by the springs 5, as shown in Fig. 1, but when in the revolution of the wheel, a tread member comes in contact with the ground, or with any uneven surface, the tread member is yieldingly compressed, by the compression of the springs, and one end of the tread member may be compressed independently of the other end, as shown in Fig. 2. And further, by means of the block 6, pivotally secured to the tread member 7 on its inner side and extending loosely between a pair of spring holding receptacles 4, the yielding tread member may be rocked or moved in the direction of its width, to have a yielding movement at either edge, as shown in Fig. 4, to provide for any projection or uneven surface engaging the tread of the wheel on one edge.

The advantages of my improved construction of a resilient tire will be readily appreciated by those skilled in the art.

I provide a resilient tire, having a solid tread, and comprising a series of yielding or movable members or parts, made separate from each other, and readily attached to and detached from the wheel proper, which is preferably made of cast metal; and each tread member or part has an independent yielding movement in the direction of its length, and also in the direction of its width, as the wheel revolves and the independent tread members come in contact with the ground, or any uneven surface thereon. Each tread member is so attached to the wheel proper, that it has substantially the same movement as if it were attached by a universal joint.

It will be understood that the details of construction of my improvements may be varied if desired.

Having thus described my invention, what I claim as new and desire to secure by Letters Patent is:—

The combination with the rim of a wheel, provided with a series of cylindrical tubular receptacles extending around the periphery thereof, and arranged in pairs, of a block, loosely supported between each pair of said receptacles, and having an inward and an outward motion, and a side motion, and a tread member, pivotally attached to said block, and a bolt at each end of said tread member, extending through a tubular receptacle, to attach said tread member to the rim of the wheel and limit the outward movement thereof, and a spring extending within each tubular receptacle and encircling said bolt, to yieldingly hold said tread member in its outward position.

F. E. ARROUQUIER.

Witnesses:
JOHN C. DEWEY,
MINNA HAAS.